US012246666B2

(12) United States Patent
Mozafarian et al.

(10) Patent No.: US 12,246,666 B2
(45) Date of Patent: Mar. 11, 2025

(54) GUARD IMPACT GROUND VEHICLE SYSTEM

(71) Applicant: Farian Inc., Temecula, CA (US)

(72) Inventors: Arran Mozafarian, Temecula, CA (US); Ramin Mozafarian, Temecula, CA (US)

(73) Assignee: Farian Inc., Temecula, CA (US)

( * ) Notice: Subject to any disclaimer, the term of this patent is extended or adjusted under 35 U.S.C. 154(b) by 0 days.

(21) Appl. No.: 18/535,174

(22) Filed: Dec. 11, 2023

(65) Prior Publication Data

US 2024/0208448 A1 Jun. 27, 2024

Related U.S. Application Data

(60) Provisional application No. 63/476,377, filed on Dec. 21, 2022.

(51) Int. Cl.
*B60R 19/40* (2006.01)

(52) U.S. Cl.
CPC .................. *B60R 19/40* (2013.01)

(58) Field of Classification Search
CPC ...... B60R 21/0134; B60R 19/40; G08G 1/16; G01S 13/931; B60W 30/08; B60W 30/0953
See application file for complete search history.

(56) References Cited

U.S. PATENT DOCUMENTS

| 4,993,985 A | 2/1991 | Bass et al. | |
|---|---|---|---|
| 6,565,147 B1 * | 5/2003 | Beals, Jr. | ................ B60R 19/42 293/126 |
| 10,235,886 B1 * | 3/2019 | Baughman | .............. B60R 19/18 |
| 2009/0009603 A1 * | 1/2009 | Kim | ........................ G08G 1/166 348/148 |
| 2017/0282826 A1 | 10/2017 | Sute | |
| 2018/0154850 A1 | 6/2018 | Yates et al. | |

(Continued)

FOREIGN PATENT DOCUMENTS

CN 212529561 2/2021
DE 102017004754 A1 * 12/2017

OTHER PUBLICATIONS

DeChao Zhao, Vehicle collision electromagnetic protection system and vehicle, Feb. 12, 2021, EPO, CN 212529561 U, Machine Translation of Description (Year: 2021).*

(Continued)

*Primary Examiner* — James A English
(74) *Attorney, Agent, or Firm* — DLA PIPER LLP (US)

(57) ABSTRACT

Embodiments of the present disclosure relate to a system for guarding a vehicle from an incoming collision. The system can include a plurality of electromagnetic panels installed on a vehicle, each electromagnetic panel being configured to, in response to receiving current, generate a magnetic field comprising field lines external from the vehicle, wherein the magnetic field interacts with a second magnetic field associated with an approaching object to generate a repulsive force; a plurality of sensors installed on the vehicle, each sensor being associated with a respective electromagnetic panel, wherein each sensor is configured to detect the approaching object; and a central component configured to provide the current to at least one of the plurality of electromagnetic panels.

20 Claims, 16 Drawing Sheets

(56) References Cited

U.S. PATENT DOCUMENTS

2020/0079308 A1\* 3/2020 Vanterpool ........... B60R 19/483
2021/0291771 A1   9/2021 Yamazaki et al.
2022/0085654 A1   3/2022 Maniktala

OTHER PUBLICATIONS

International Search Report and Written Opinion for International Application No. PCT/US23/83428, mailed Apr. 3, 2024, 10 Pages.

\* cited by examiner

GUARD IMPACT GROUND VEHICLE SYSTEM

CROSS-REFERENCE TO RELATED APPLICATIONS

This application claims priority to U.S. Provisional Application No. 63/476,377, filed Dec. 21, 2022, which is incorporated herein by reference in its entirety.

BACKGROUND OF THE DISCLOSURE

In the automobile industry, cars are generally built with certain specification for safety, such as seatbelts, anti-lock braking systems (ABS), sensors, modified and/or reinforced front and rear bumpers, etc. However, during car accidents, regardless of the existence of certain safety features, drivers may still act negligently and fail to stop on time. This can lead to rear ending another vehicle and other types of collisions. For example, car accidents can occur when a vehicle makes a right turn onto a main road and the oncoming car from left hand side collides. There are many ways and possibilities that operators and drivers of vehicles can get into car accidents.

SUMMARY OF THE DISCLOSURE

According to one aspect of the present disclosure, a method for guarding a vehicle from an incoming collision can include detecting, via one or more sensors installed on a vehicle, an object approaching the vehicle; transmitting a detection signal to a central component installed at the vehicle; identifying one or more relevant electromagnetic panels of a plurality of electromagnetic panels installed on the vehicle; initiating electric power to the identified electromagnetic panels; and generating, via the one or more electromagnetic panels, a magnetic field comprising field lines external from the vehicle, wherein the magnetic field interacts with a second magnetic field associated with the approaching object to generate a repulsive force.

In some embodiments, the object can include a second vehicle. In some embodiments, the second magnetic field can be generated by detecting, via one or more second sensors installed on the second vehicle, the vehicle approaching the second vehicle; transmitting a second detection signal to a second central component installed at the second vehicle; identifying one or more second relevant electromagnetic panels of a second plurality of electromagnetic panels installed on the second vehicle; initiating electric power to the second identified electromagnetic panels; and generating, via the one or more second electromagnetic panels, the second magnetic field.

In some embodiments, the one or more sensors can include one or more ultrasonic sensors. In some embodiments, the detection signal can include an identifier of the one or more relevant electromagnetic panels. In some embodiments, the one or more relevant electromagnetic panels can be installed at one of a front fender, a back fender, a passenger door, a driver door, a back bumper, or a front bumper of the vehicle. In some embodiments, the one or more relevant electromagnetic panels can include a first electromagnetic panel and a second electromagnetic panel. In some embodiments, the first and second electromagnetic panels each can include a plurality of electromagnetic cell units. In some embodiments, the plurality of electromagnetic cell units can be arranged in an array. In some embodiments, the first and second electromagnetic panels can include a monopolar configuration. In some embodiments, the magnetic field can include magnetic field lines flowing from the first electromagnetic panel to the first electromagnetic panel and from the second electromagnetic panel to the second electromagnetic panel. In some embodiments, the first and second electromagnetic panels can include a bipolar configuration. In some embodiments, the magnetic field comprises magnetic field lines flowing from the first electromagnetic panel to the second electromagnetic panel.

According to another aspect of the present disclosure, a system for guarding a vehicle from an incoming collision can include a plurality of electromagnetic panels installed on a vehicle. Each electromagnetic panel can be configured to, in response to receiving current, generate a magnetic field that can include field lines external from the vehicle, wherein the magnetic field interacts with a second magnetic field associated with an approaching object to generate a repulsive force. The system can also include a plurality of sensors installed on the vehicle. Each sensor can be associated with a respective electromagnetic panel and each sensor can be configured to detect the approaching object. The system can also include a central component configured to provide the current to at least one of the plurality of electromagnetic panels.

In some embodiments, in response to detecting the approaching object, the respective sensor can be configured to transmit a detection signal to the central component. In some embodiments, in response to receiving the detection signal, the central component can be configured to identify one or more relevant electromagnetic panels of a plurality of electromagnetic panels installed on the vehicle; and initiate the current to the identified electromagnetic panels. In some embodiments, the plurality of electromagnetic panels can be installed at at least one of a front fender, a back fender, a passenger door, a driver door, a back bumper, or a front bumper of the vehicle. In some embodiments, the one or more relevant electromagnetic panels can include a first electromagnetic panel and a second electromagnetic panel. In some embodiments, the first and second electromagnetic panels can include a monopolar configuration. In some embodiments, the first and second electromagnetic panels can include a bipolar configuration.

BRIEF DESCRIPTION OF THE FIGURES

Various objectives, features, and advantages of the disclosed subject matter can be more fully appreciated with reference to the following detailed description of the disclosed subject matter when considered in connection with the following drawings, in which like reference numerals identify like elements.

Figure 1:
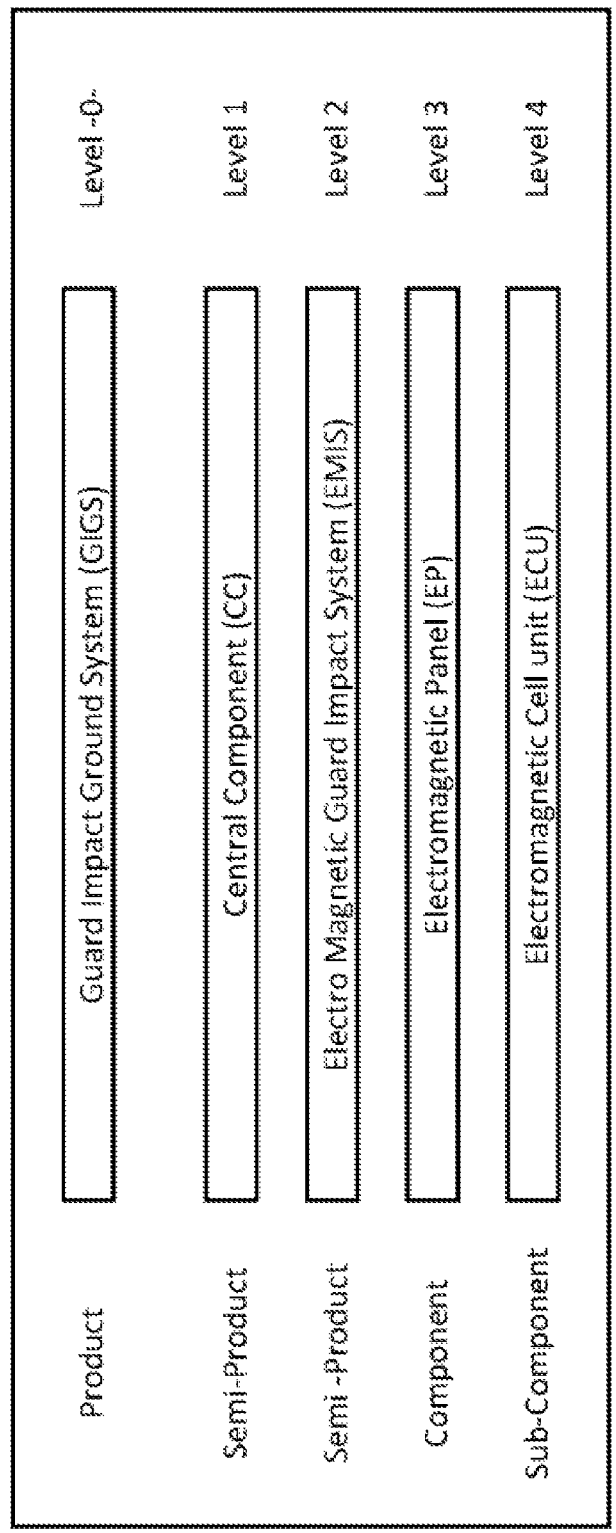
FIG. 1 illustrates a conceptual structure of a guard impact ground vehicle system according to some embodiments of the present disclosure.

The drawings are not necessarily to scale, or inclusive of all elements of a system, emphasis instead generally being placed upon illustrating the concepts, structures, and techniques sought to be protected herein.

DESCRIPTION

The following detailed description is merely exemplary in nature and is not intended to limit the claimed invention or the applications of its use.

Embodiments of the present disclosure are directed to systems and methods for guarding vehicles from collisions via repulsive electromagnetic forces. The disclosed guard impact ground system comprises of a product system that can minimize cars accidents in a contactless way. The disclosed guard impact ground system can assist mutually equipped vehicles with minimizing collisions. The disclosed guard impact ground system can include various electromagnetic devices placed around various areas of a vehicle (e.g., front and back bumpers, around the sides, etc.). In some embodiments, the disclosed guard impact ground system can be equipped at time of the original manufacturing of the vehicle or customized after the car has been built.

In some embodiments, the disclosed guard impact ground system can include one or more Amperian-loop linear fields and lines in the form of electromagnetic panels, which can generate diamagnetic repulsion. The disclosed guard impact ground system can include an electromagnetic device placed in the front, back, and around the body of vehicles. When ground vehicles mutually equipped with the disclosed guard impact ground system collide, the system can minimize the impact of the collision and protect the vehicles from devastating car accidents. In some embodiments, the disclosed guard impact ground system can include one or more electromagnetic impact shields that contain an adjustable rod, rotor, and an electromagnetic panel. In some embodiments, an electromagnetic panel can include a plurality of electromagnetic cell units that can be activated by sensors. Once they are activated, the units can then be powered and activated by a central component. In some embodiments, the disclosed guard impact ground system can include various metamaterials and can be assembled of multiple elements comprising composite materials, as well as other materials that can be arranged in repeating patterns that are smaller than wavelengths of the phenomena they influence.

In some embodiments, detection of incoming objects can begin at a starting range of about four feet. In some embodiments, activation of the electromagnetic panels can begin at a range of about three feet. In some embodiments, launch power can begin at a range of about two feet, where the first wave of electromagnetic panels counter the opposing vehicle's electromagnetic panels. In some embodiments, the repulsion of outer magnetic fields for both vehicles can compress between two feet and a foot. In some embodiments, the repulsion of inner magnetic fields can compress between six to twelve inches. In some embodiments, a halt amplifies the continuity until the incoming object's velocity near the impact point becomes zero. In some embodiments, the disclosed principles can apply to vehicles with an incoming speed of between about 25 and 70 miles per hour. In addition, the disclosed techniques can apply to compact, standard sedans and other full size vehicles (approximately 2500 to 3800 pounds). In addition, an example surge current can be based on a voltage of between about 220 and 240 volts.

FIG. 1 illustrates a conceptual structure of a guard impact ground vehicle system according to some embodiments of the present disclosure. At the product level (level 0) is the disclosed guard impact ground system. At the semi-product levels (levels 1 and 2) are the central component that is installed in the vehicle to control the sensors and electromagnetic panels, as well as the electromagnetic guard impact system. At the component level (level 3) are the electromagnetic panels themselves. At the sub-component level (level 4) is the electromagnetic cell unit that makes up the electromagnetic panels.

Figure 2:
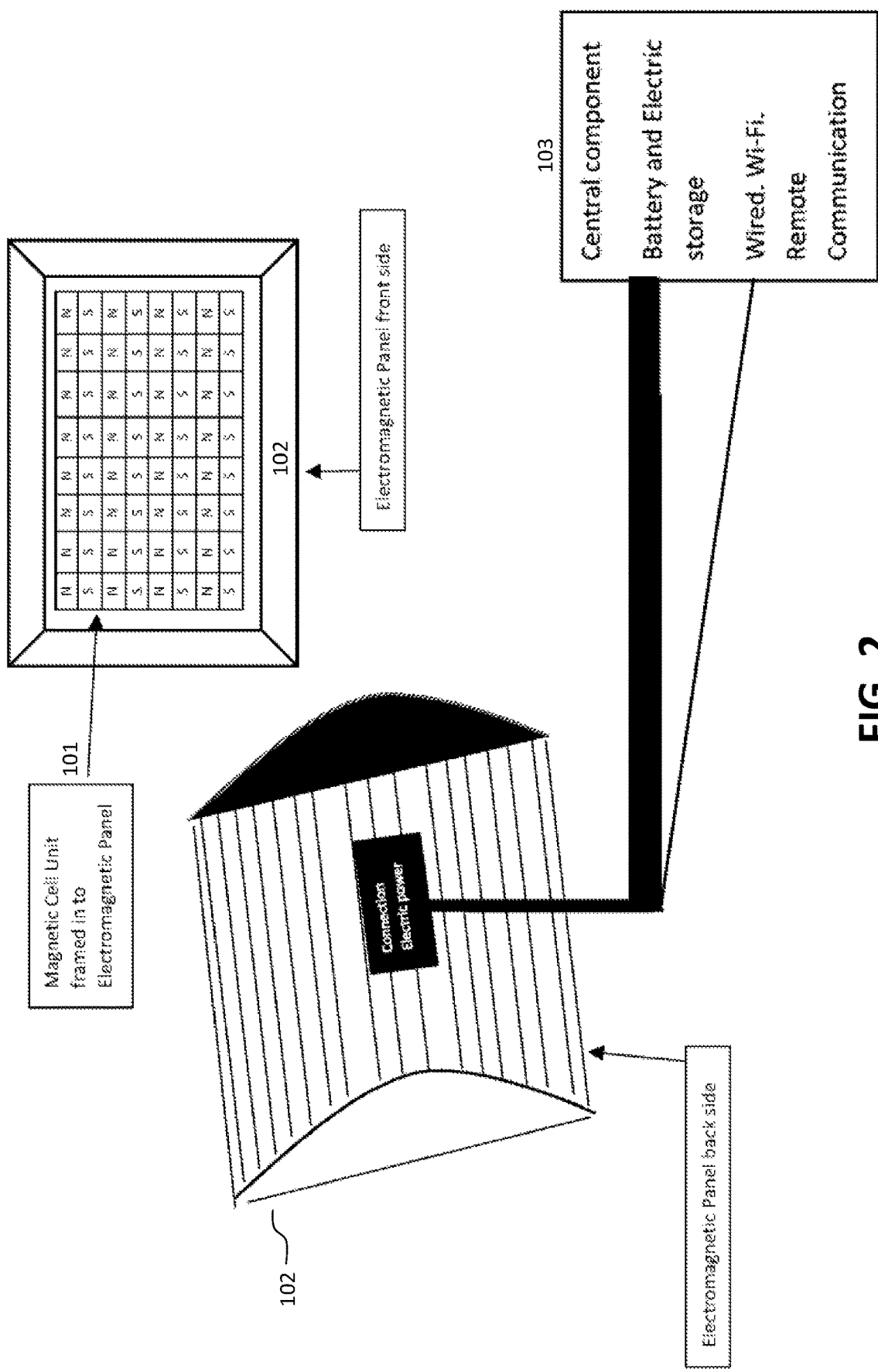
FIG. 2 is an electromagnetic panel for use within the guard impact ground vehicle system according to some embodiments of the present disclosure.

FIG. 2 is an electromagnetic panel 102 for use within the guard impact ground vehicle system of FIG. 1 according to some embodiments of the present disclosure. Additional details with respect to the electromagnetic panel are discussed in relation to FIGS. 12-14. The electromagnetic panel 102 can include both a front side and a backside. On the front side, which faces away from the vehicle, the electromagnetic panel 102 can include a plurality of electromagnetic cell units 101. In some embodiments, the electromagnetic cell units 101 can be arranged in an array or a grid and can be framed within the electromagnetic panel 102. In some embodiments, the electromagnetic panel 102 can be fixed in a non-adjustable manner to a vehicle body (e.g., bumper, fender, side doors, etc.) so that it can offer protection at the point of impact. In addition, the electromagnetic panel 102 can be powered by a central component 103. In some embodiments, the central component 103 can include one or more of a battery and electric storage, connection to wi-fi, and other remote communication protocols. In addition, the electromagnetic panel 102 can be connected to the central component 103 via a wired connection. Such a wired connection can provide power to the electromagnetic panel 102, causing current to flow through the electromagnetic cell units 101, which causes Amperian loops to be generated that ultimately activate a repulsion effect. In some embodiments, an electromagnetic panel 102 as described herein can also include one or more sensors configured to sense/detect an oncoming collision. For example, the sensors can include an ultrasonic sensor or other type of sensor that can act in a similar manner to detect an approaching object. In some embodiments, the central component 103 can be installed in the dashboard of the vehicle or at a driver's table interface for interacting with the other component of the guard impact ground vehicle system.

Figure 3:
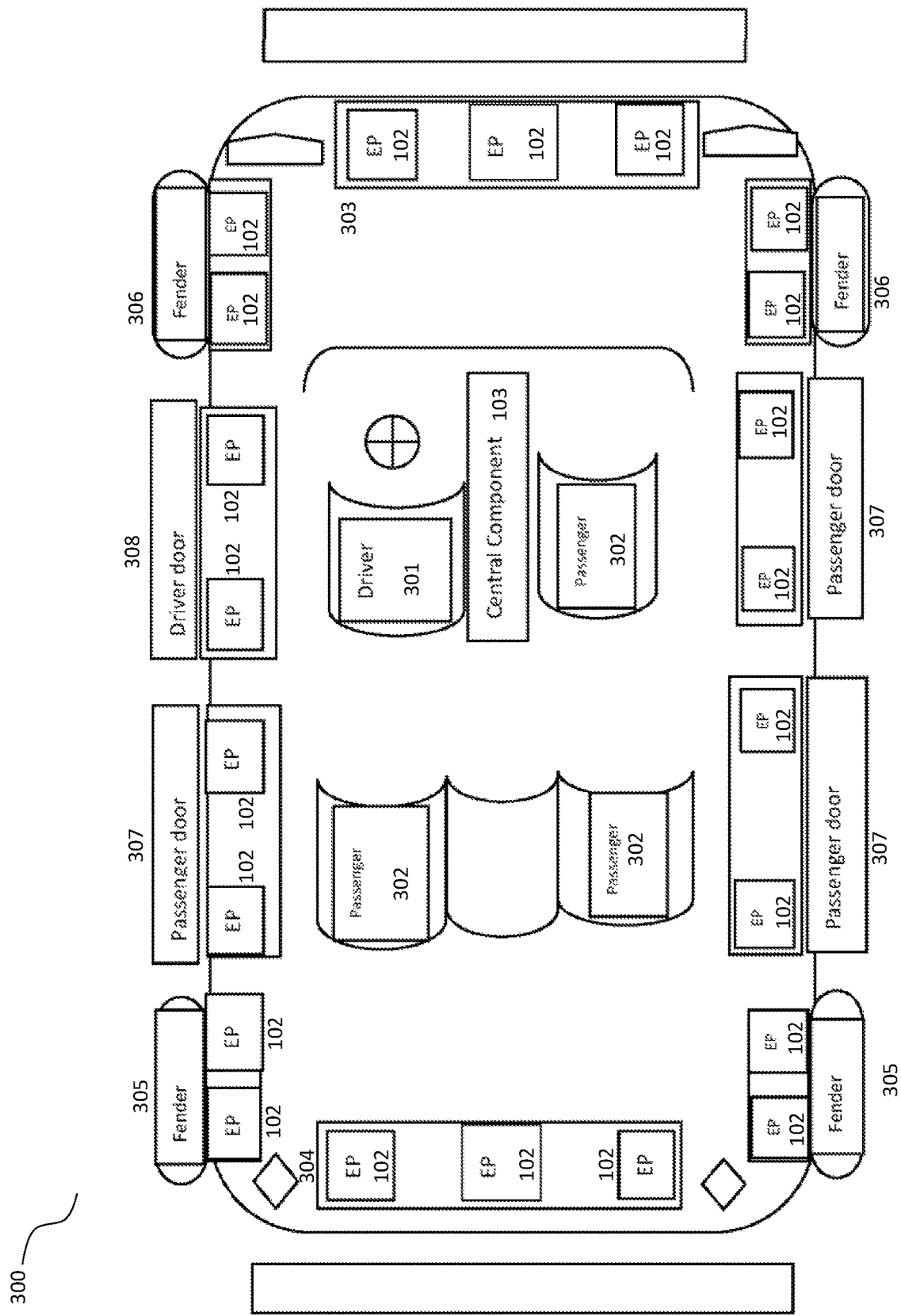
FIG. 3 shows a vehicle body with the disclosed guard impact ground vehicle system according to some embodiments of the present disclosure.

FIG. 3 shows a system 300 of a vehicle body with the disclosed guard impact ground vehicle system according to some embodiments of the present disclosure. The system 300 includes a vehicle with a driver seat 301 and passenger seats 302. In addition, the vehicle includes a front bumper 303, a back bumper 304, back fenders 305, front fenders 306, passenger doors 307, and a driver door 308. In addition, the vehicle can include a plurality of electromagnetic panels 102 installed at various points surrounding the vehicle. For example, as shown in FIG. 3, there can be two electromagnetic panels 102 installed at each of the back fenders 305, passenger doors 307, the driver door 308, and the front fender 306. In addition, there can be three electromagnetic panels 102 installed at each of the front bumper 303 and the back bumper 304. It is important to note, however, that this arrangement and number of electromagnetic panels 102 is merely exemplary in nature and that various other configurations could be employed. In addition, a central component 103 can be installed within the vehicle, as well as connected via a wired connection to each of the electromagnetic panels 102.

Figure 4:
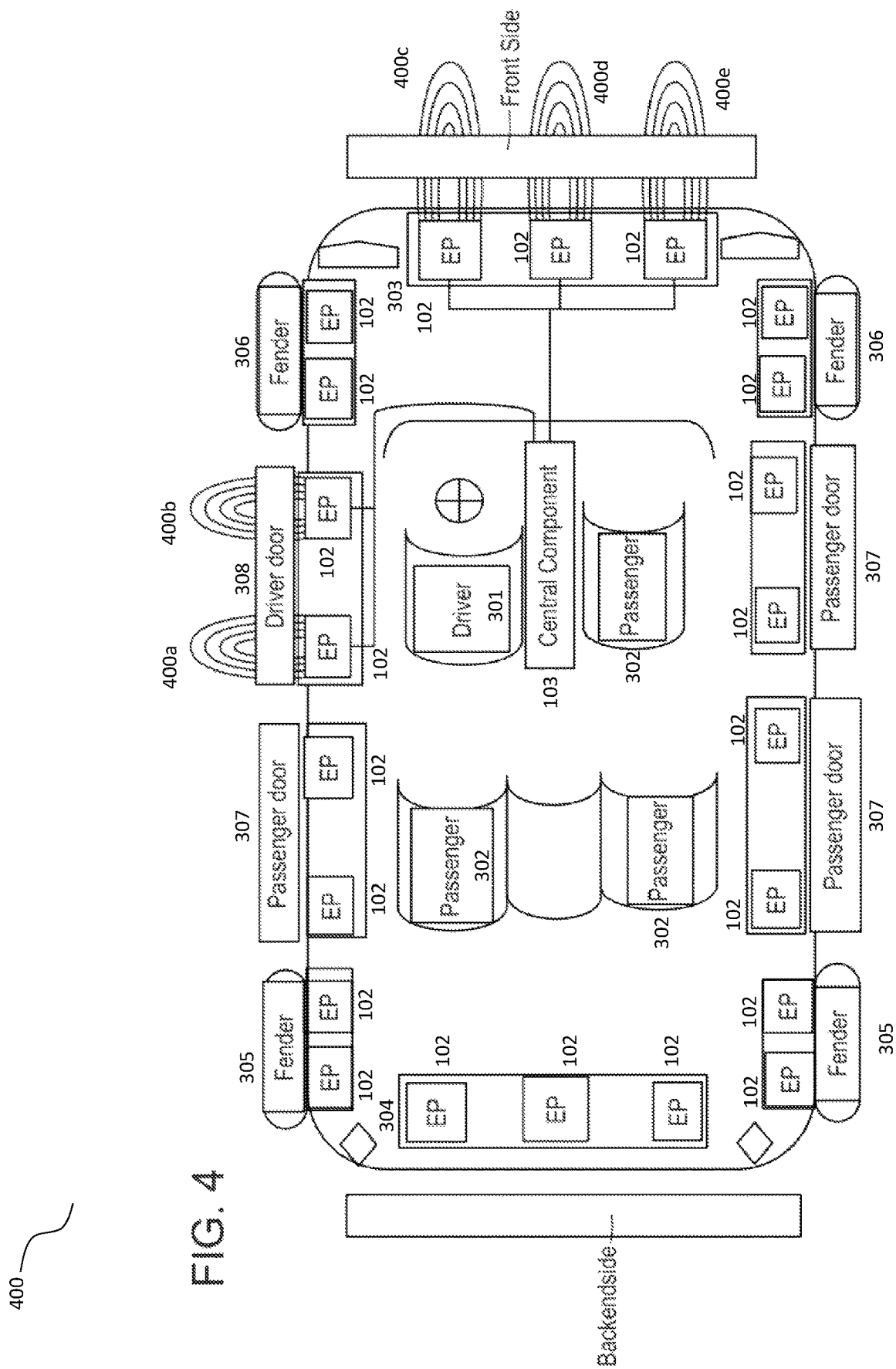
FIG. 4 shows a vehicle body with the disclosed guard impact ground vehicle system with monopolar dual electromagnetic panels according to some embodiments of the present disclosure.

FIG. 4 shows a system 400 of a vehicle body with the disclosed guard impact ground vehicle system with monopolar dual electromagnetic panels according to some embodiments of the present disclosure. In some embodiments, the system 400 can be similar to or the same as the system 300 in FIG. 3 except that certain electromagnetic panels 102 have been activated. For example, in response detecting an oncoming collision at the driver door 308 and the front bumper 303 (e.g., via sensors contained in the respective electromagnetic panels 102), the central component 103 can activate the relevant electromagnetic panels 102. The central component 103 provides surges of current to the electromagnetic panels 102 via the wired connection. When the electromagnetic cell units 101 (not shown) arranged in a monopolar condition receive such amounts of current, electromagnetic fields 400a-e are created for each electromagnetic panel 102 that extend outside the boundary of the vehicle. Each field 400 has lines that begin and end at each respective electromagnetic panel 102. If a second vehicle was the object that caused the electromagnetic panels 102 to be activated and that vehicle had a similar configuration of electromagnetic panels 102 installed, the second vehicle's electromagnetic panels 102 would also be activated by its own central component 103. The resulting electromagnetic field lines can interact with the electromagnetic fields 400 and minimize or prevent the vehicles from colliding because of the repulsive electromagnetic forces.

Figure 5:
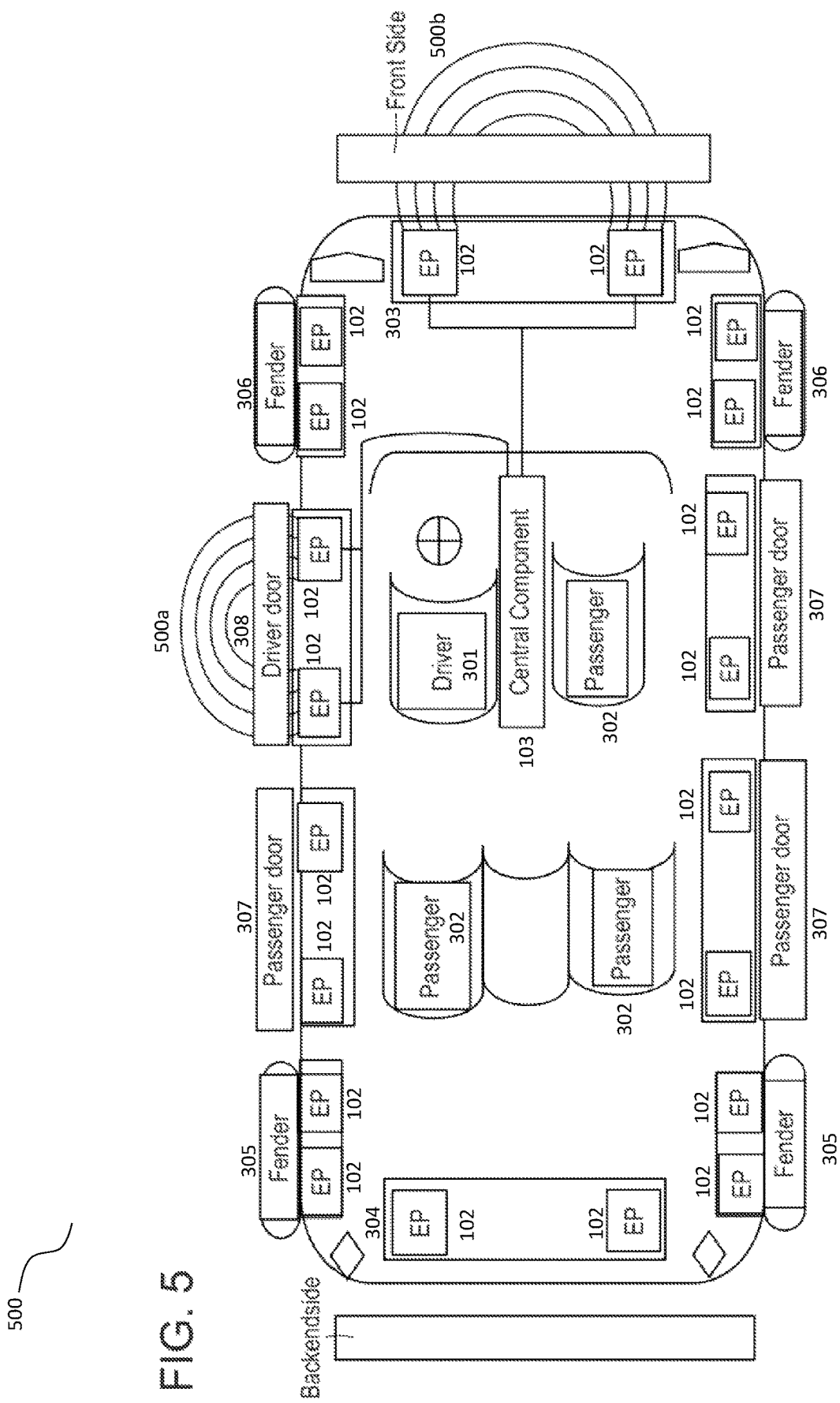
FIG. 5 shows a vehicle body with the disclosed guard impact ground vehicle system with bipolar dual electromagnetic panels according to some embodiments of the present disclosure.

FIG. 5 shows a system 500 of a vehicle body with the disclosed guard impact ground vehicle system with bipolar dual electromagnetic panels according to some embodiments of the present disclosure. In some embodiments, the system 500 can be similar to or the same as the system 300 in FIG. 3 except that certain electromagnetic panels 102 have been activated. In addition, the system 500 can be similar to or the same as the system 400 in FIG. 4 except that the electromagnetic panels 102 are bipolar instead of monopolar. For example, in response detecting an oncoming collision at the driver door 308 and the front bumper 303 (e.g., via sensors contained in the respective electromagnetic panels 102), the central component 103 can activate the relevant electromagnetic panels 102. The central component 103 provides surges of current to the electromagnetic panels 102 via the wired connection. When the electromagnetic cell units 101 (not shown) arranged in a bipolar condition receive such amounts of current, electromagnetic fields 500a-b are created for each grouping of electromagnetic panels 102 that extend outside the boundary of the vehicle. Each field 500 has lines that begin at one electromagnetic panel 102 and end at the adjacent electromagnetic panel 102. If a second vehicle was the object that caused the electromagnetic panels 102 to be activated and that vehicle had a similar configuration of electromagnetic panels 102 installed, the second vehicle's electromagnetic panels 102 would also be activated by its own central component 103. The resulting electromagnetic field lines can interact with the electromagnetic fields 400 and minimize or prevent the vehicles from colliding because of the repulsive magnetic forces.

Figure 6:
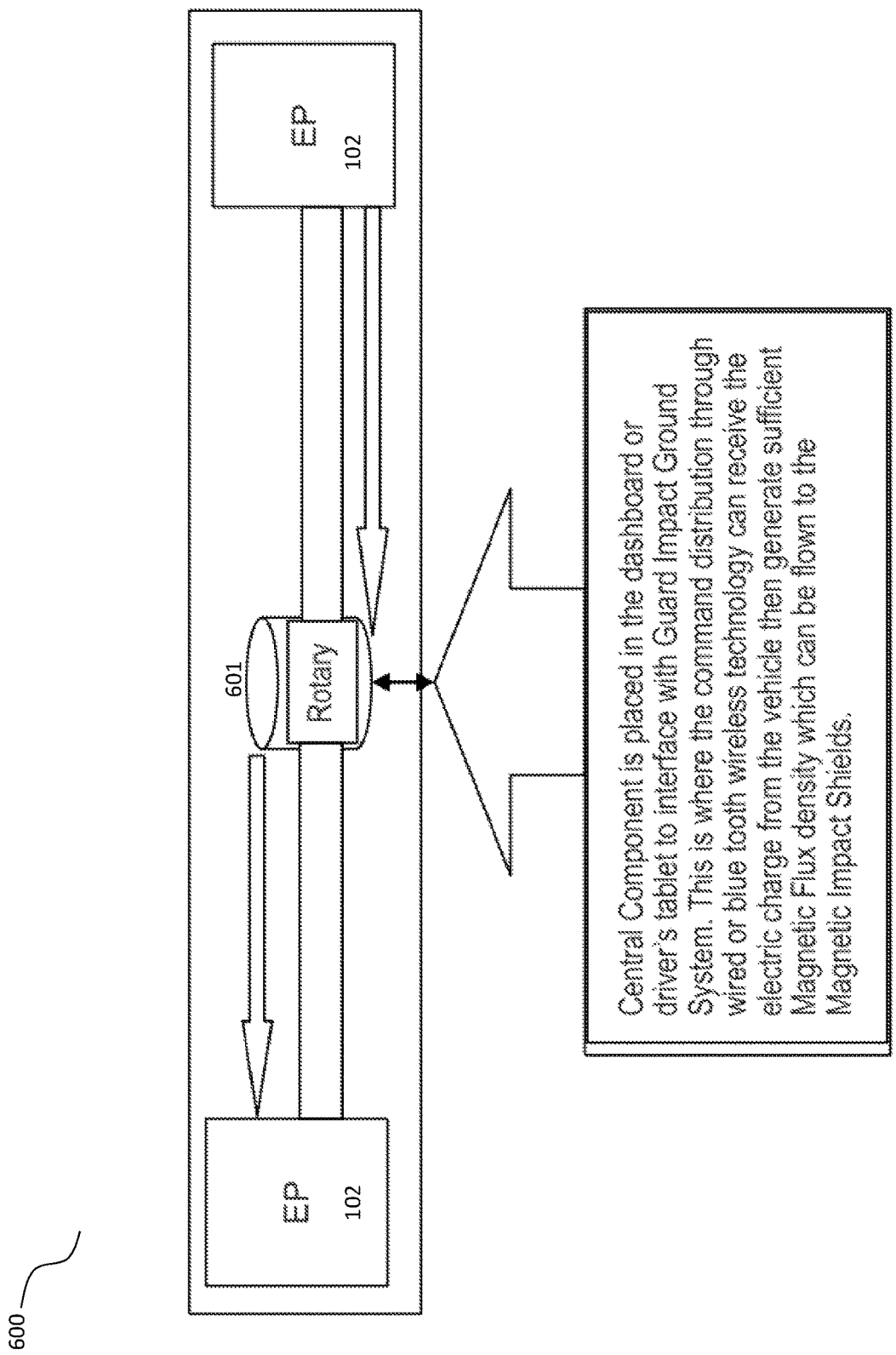
FIG. 6 shows an electromagnetic impact shield according to some embodiments of the present disclosure.

FIG. 6 shows an electromagnetic impact shield 600 according to some embodiments of the present disclosure. In some embodiments, an electromagnetic impact shield 600 can include a plurality of electromagnetic panels 102 connected to a rotary 601. The electromagnetic impact shield 600 can be a sub-component of the guard impact ground system. In some embodiments, the rotary 601 can include an adjustable transmission rod and rotary component that can adjust the wideness and/or narrowness of the transmission rod. In some embodiments, this can provide flexibility at the time of installation so that the system may be customized to conform to various safety requirements. In some embodiments, an electromagnetic impact shield 600 can be installed at various points of a vehicle, such as the fenders, bumpers, and/or doors.

Figure 7:
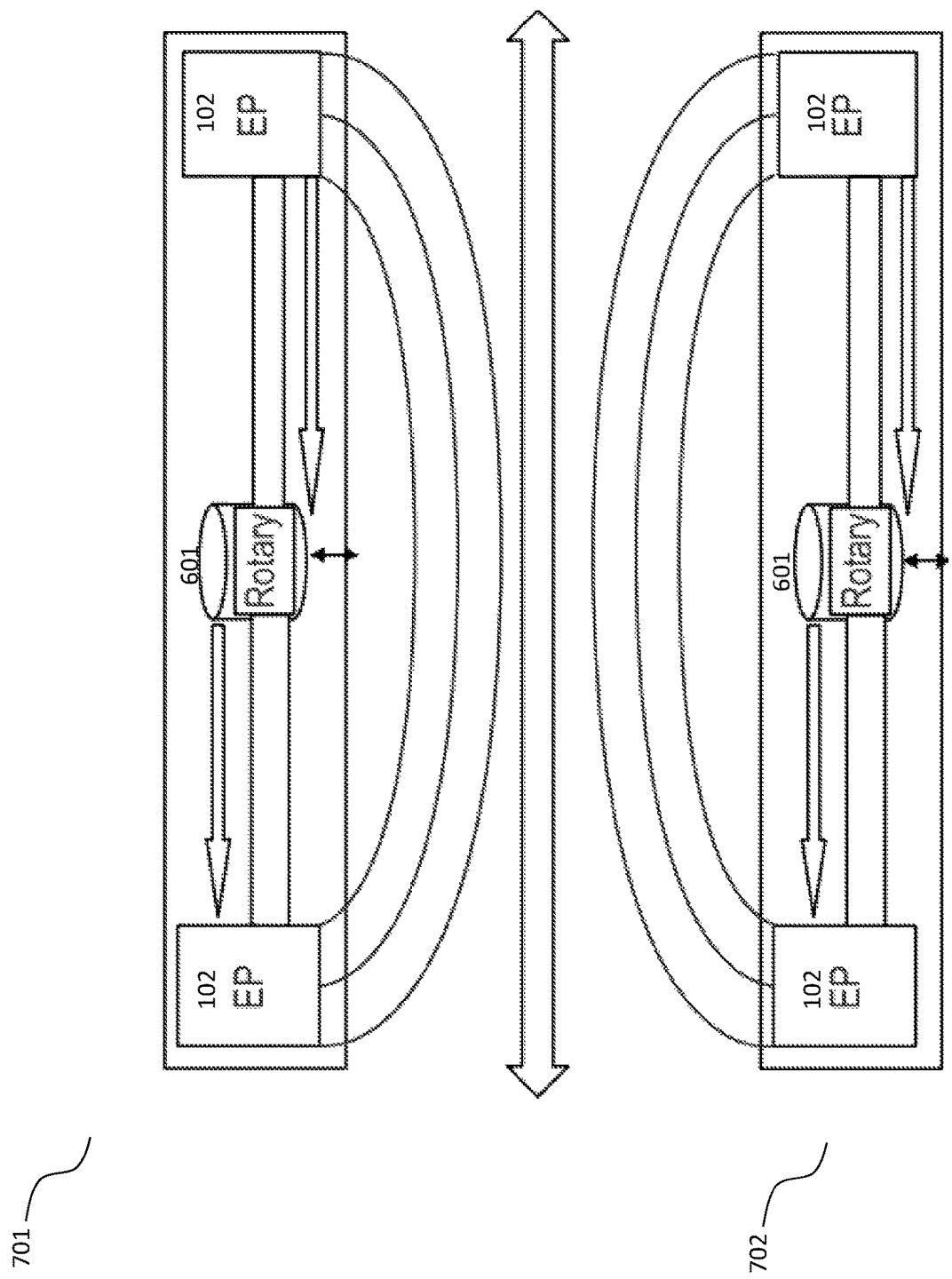
FIG. 7 shows how two electromagnetic impact shields generate repulsive forces according to some embodiments of the present disclosure.

FIG. 7 shows how two electromagnetic impact shields 701 and 702 generate repulsive forces according to some embodiments of the present disclosure. Each of the electromagnetic impact shields 701 and 702 can be similar to or the same as the electromagnetic impact shield 600 of FIG. 6. Each of the electromagnetic impact shields 701 and 702 can be contained within separate vehicles to defuse an impact between said vehicles, which are reciprocally equipped with the disclosed guard impact ground vehicle system. As discussed above, the respective central components 103 charge and activate the respective electromagnetic panels 102. The resulting electromagnetic fields can interact to neutralize the potential points of impact via repulsive forces.

Figure 8:
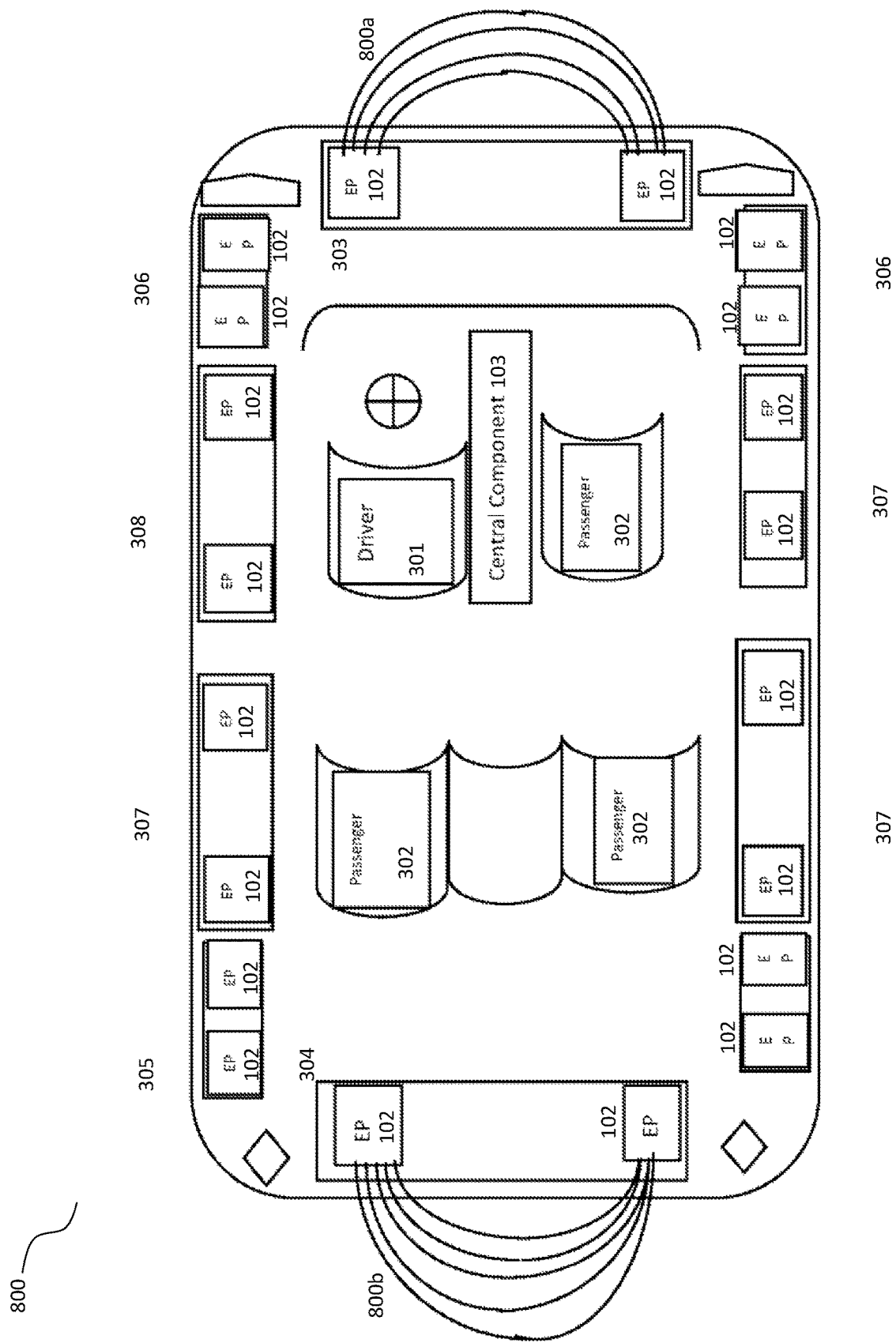
FIG. 8 shows a vehicle body with active front and back repulsion according to some embodiments of the present disclosure.

FIG. 8 shows a system 800 of vehicle body with active front and back repulsion according to some embodiments of the present disclosure. In some embodiments, the system 800 can be the same as or similar to the system 500 of FIG. 5, where the electromagnetic panels 102 are configured in a bipolar manner. Both the front bumper and back bumper electromagnetic panel configurations are activated, and the electromagnetic fields 800a-b begin at one electromagnetic panel 102 and end at the adjacent electromagnetic panel 102.

Figure 9:
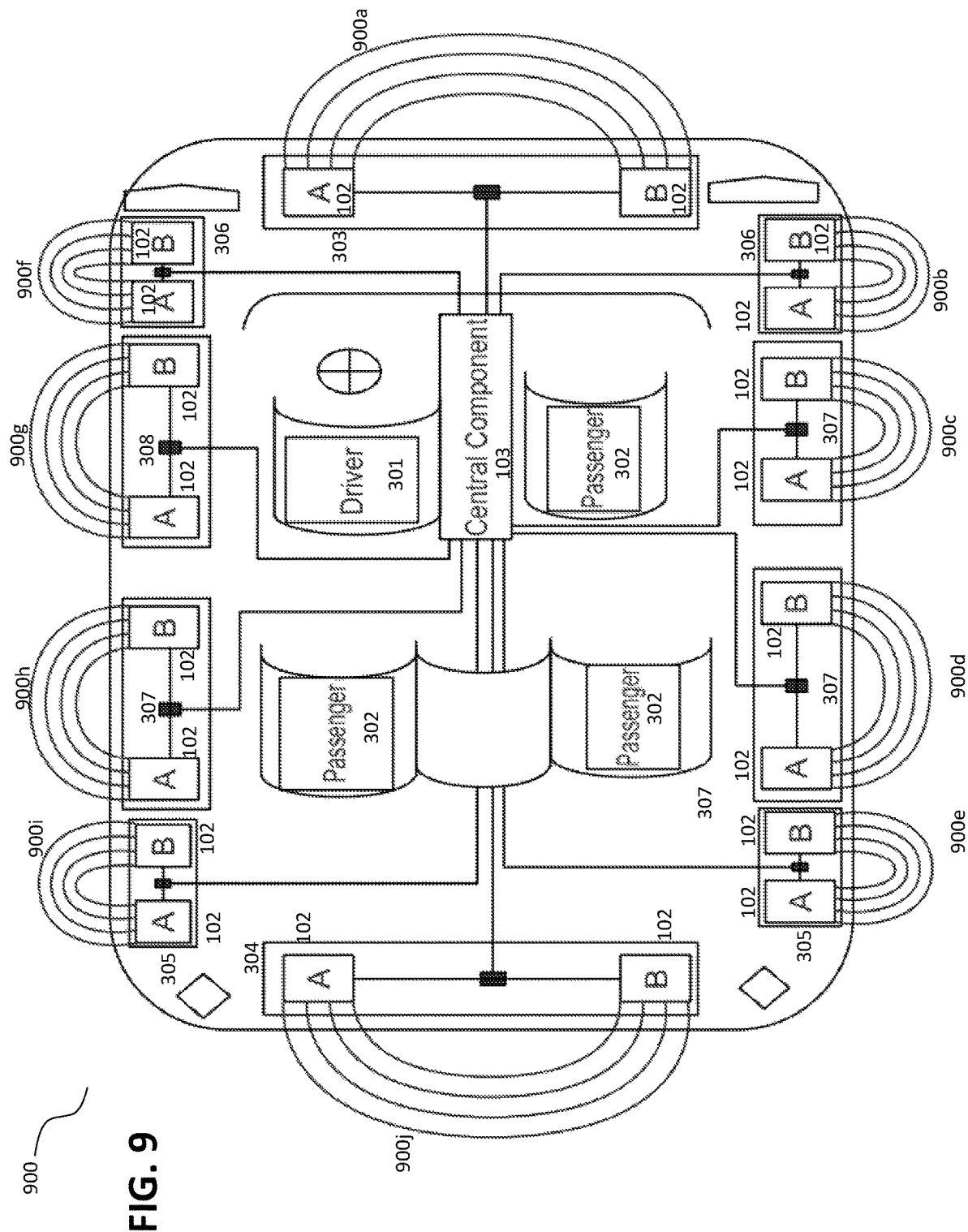
FIG. 9 shows a vehicle body with all sides having active repulsion according to some embodiments of the present disclosure.

FIG. 9 shows a system 900 of a vehicle body with all sides having active repulsion according to some embodiments of the present disclosure. In some embodiments, the system 800 can be the same as or similar to the system 500 of FIG. 5, where the electromagnetic panels 102 are configured in a bipolar manner. The system 900 has, for illustrative purposes, all configurations of electromagnetic panels 102 activated, which reside on the passenger doors 307, the driver door 308, the front bumper 303, the back bumper 304, and the fenders 306. Because of the bipolar manner of configuration, each electromagnetic field 900a-j begins at one electromagnetic panel 102 and flows to the adjacent electromagnetic panel 102.

Figure 10:
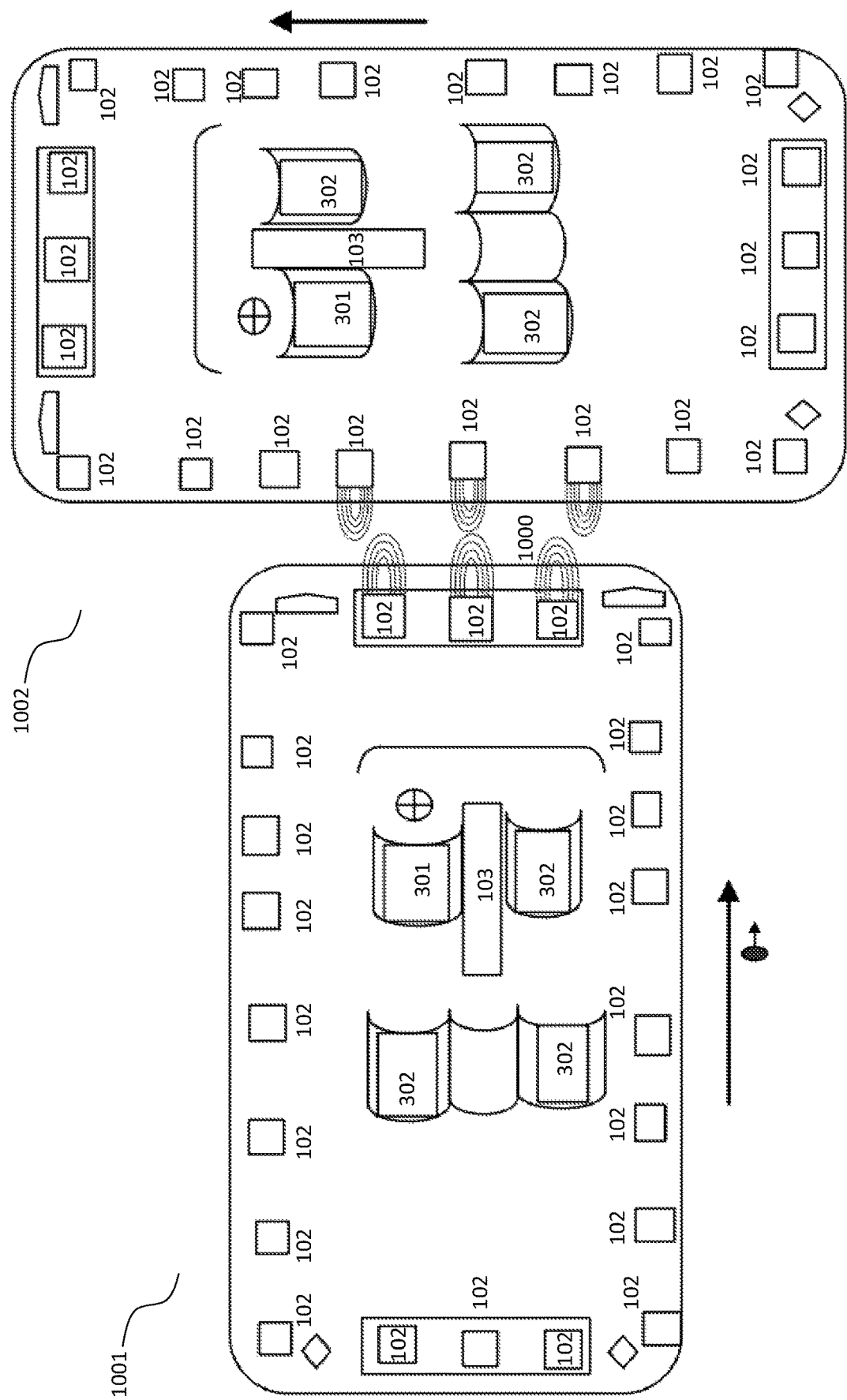
FIG. 10 shows two vehicles with a guard impact ground system interacting according to some embodiments of the present disclosure.

FIG. 10 shows two vehicles 1001 and 1002 with a guard impact ground system interacting according to some embodiments of the present disclosure. Each vehicle can include a system similar to that described in FIG. 4, where the various electromagnetic panels 102 are configured in a monopolar manner. As the vehicles 1001 and 1002 approach each other, each can separately (via one or more sensors, not shown) identify that the other vehicle is oncoming and rapidly approaching. The sensors then transmit a signal to the respective central component 103, which in turn initiates surge of current to the relevant electromagnetic panels 102 (at the front bumper of vehicle 1001 and at the passenger doors of the vehicle 1002). The resulting electromagnetic fields 1000 interact, which causes a repulsive force to occur between the vehicles 1001 and 1002, thereby minimizing/preventing the collision of said vehicles.

Figure 11:
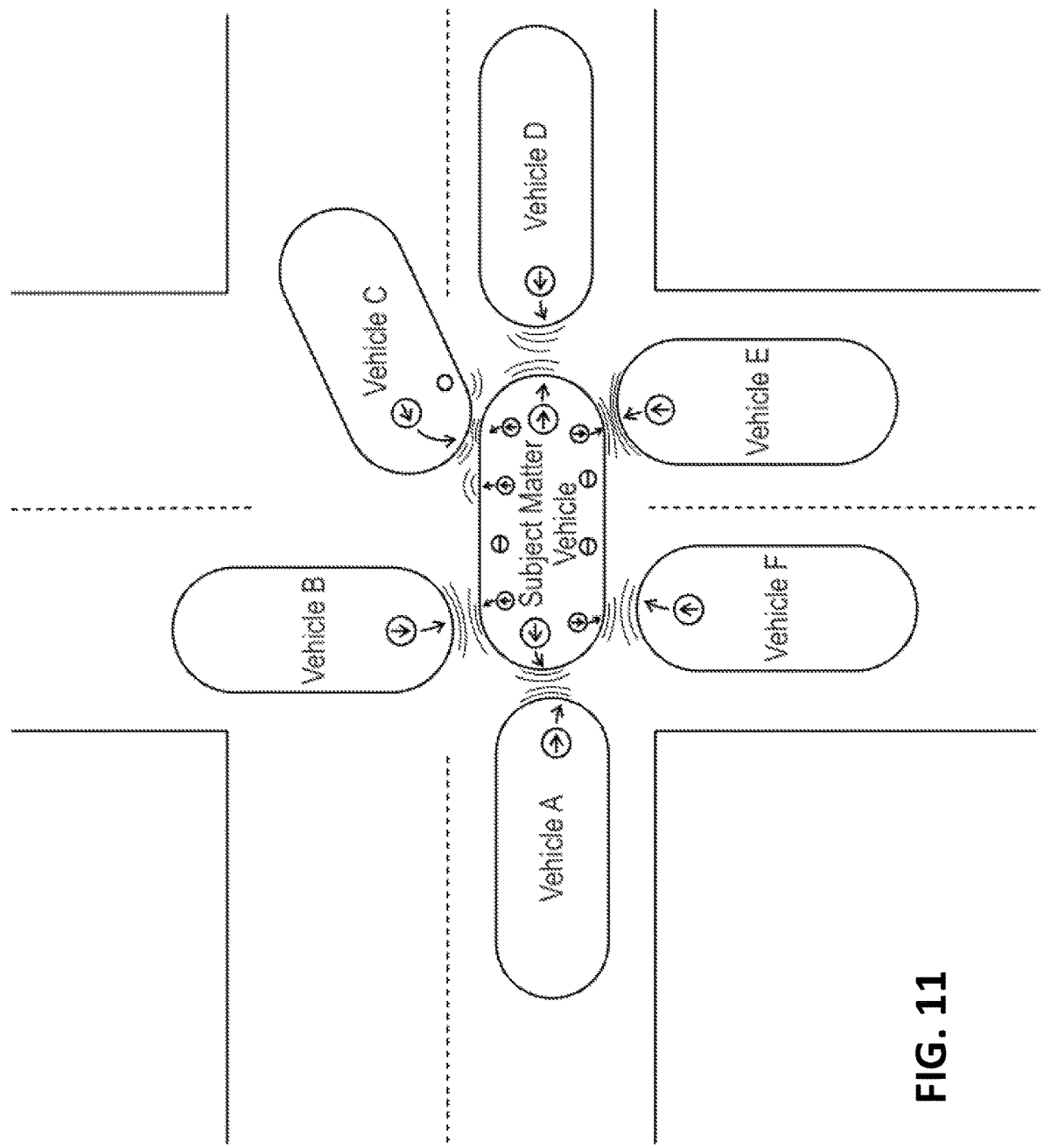
FIG. 11 shows how a vehicle with the guard impact ground system can interact with a plurality of vehicles according to some embodiments of the present disclosure.

FIG. 11 shows how a vehicle with the guard impact ground system can interact with a plurality of vehicles according to some embodiments of the present disclosure. While potentially exemplary in nature, the subject matter vehicle that is equipped with the disclosed guard impact ground vehicle system at the center of the intersection has vehicles A-F approaching it, each of which are also equipped with the disclosed guard impact ground vehicle system. Consistent with the principles discussed herein, repulsive forces can be generated surrounding the subject matter vehicle and minimizing the damage from any collisions.

Figure 12:
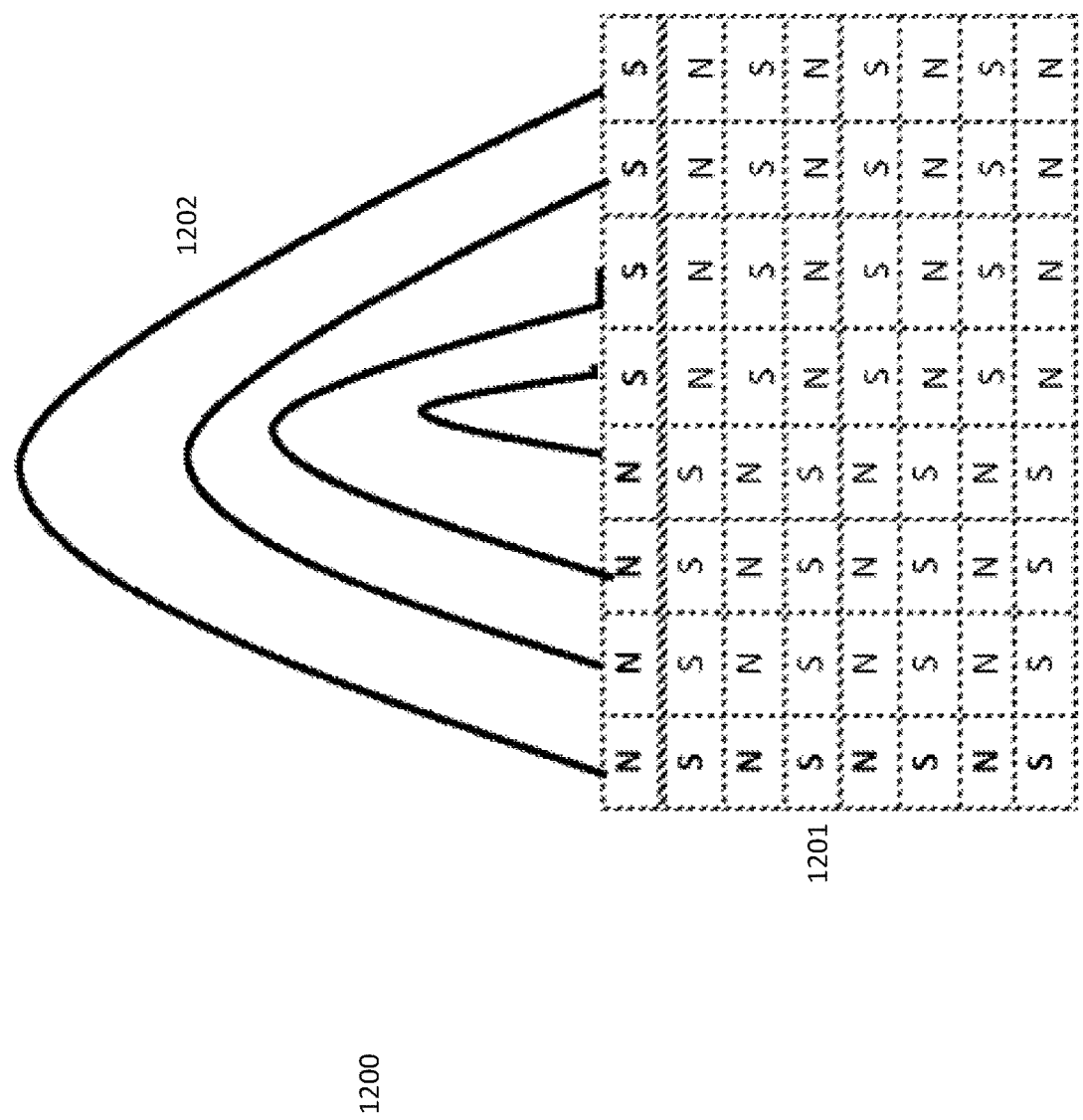
FIG. 12 shows an electromagnetic panel with monopolarization according to some embodiments of the present disclosure.

FIG. 12 shows an electromagnetic panel 1200 with monopolarization according to some embodiments of the present disclosure. In some embodiments, the electromagnetic panel 1200 can include a plurality of electromagnetic cell units arranged in an array 1201. The electromagnetic cell unit array 1201 can include rows of electromagnetic cell units, where each comprises half north poles and half south poles, and each row switches polarity. This in turn creates the electromagnetic field 1202 that begins at one end of the electromagnetic panel 1200 and ends at the other end of the electromagnetic panel 1200.

Figure 13:
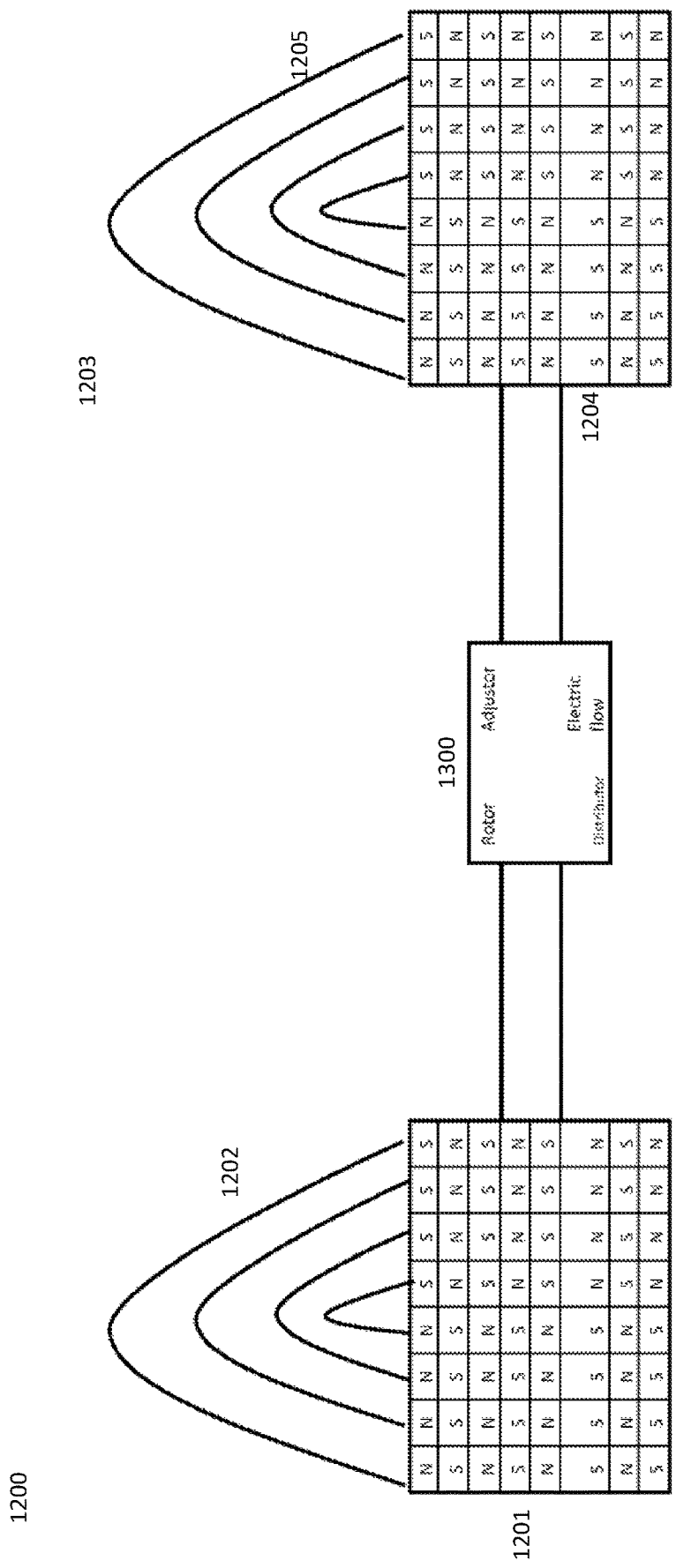
FIG. 13 shows two electromagnetic panels with monopolarization in twin condition according to some embodiments of the present disclosure.

FIG. 13 shows two electromagnetic panels 1200 and 1203 with monopolarization in twin condition according to some embodiments of the present disclosure. In other words, the electromagnetic panels 1200 and 1203 form an electromagnetic shield unit, such as that described in FIG. 6. The electromagnetic panel 1200 comprises an electromagnetic cell unit array 1201 and creates an electromagnetic field 1202. In addition, the electromagnetic panel 1203 comprises an electromagnetic cell unit array 1204 and creates an electromagnetic field 1205. Further, the electromagnetic panels 1200 and 1203 are connected via a rotary 1300 that can include a rotor, an adjustor, a distributor, and electric flow for power distribution.

Figure 14:
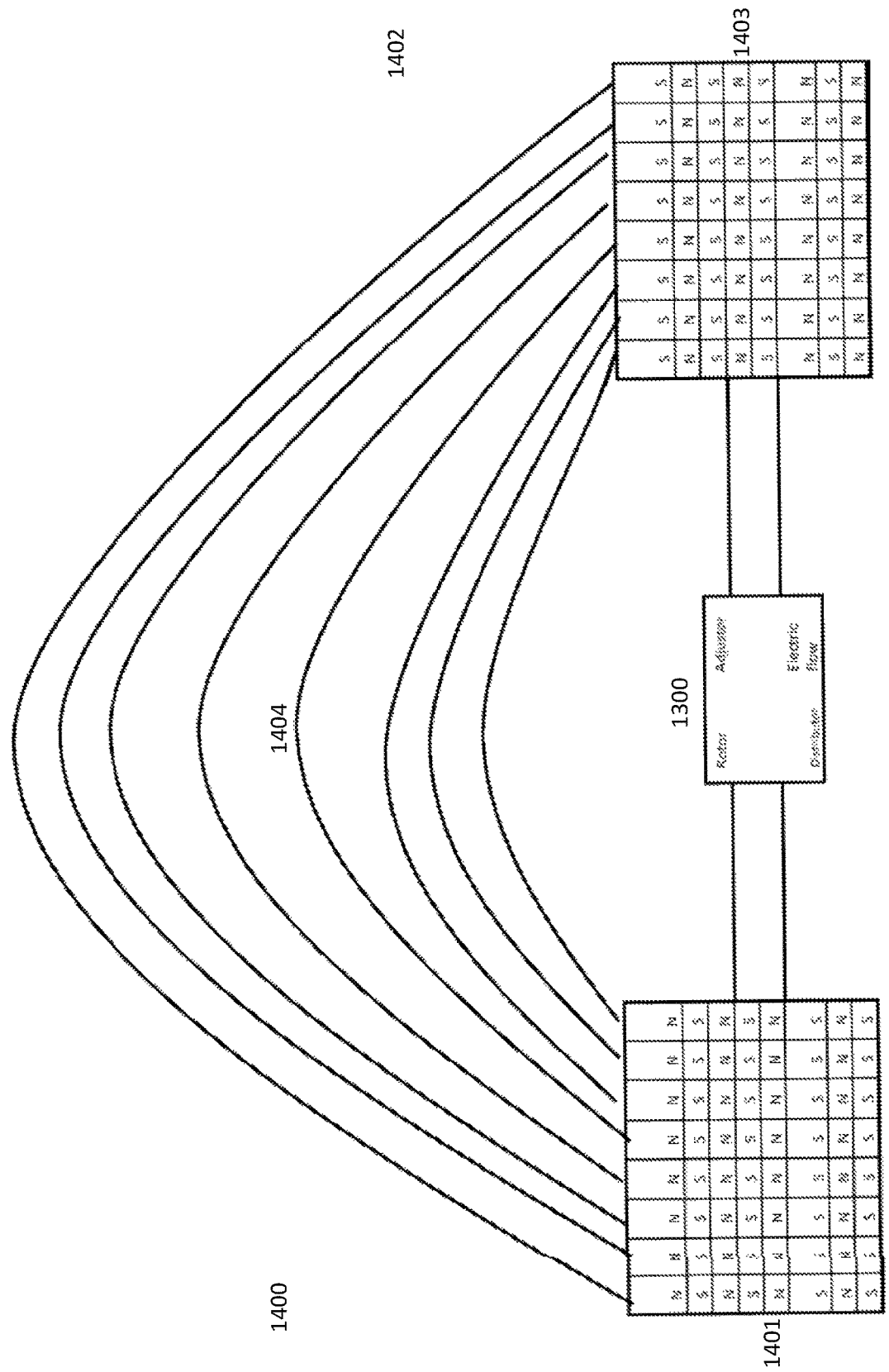
FIG. 14 shows two electromagnetic panels with bipolarization in non-twin condition according to some embodiments of the present disclosure.

FIG. 14 shows two electromagnetic panels with bipolarization in non-twin condition according to some embodiments of the present disclosure. In other words, the electromagnetic panels 1400 and 1402 form an electromagnetic shield unit, such as that described in FIG. 6. The electromagnetic panel 1400 comprises an electromagnetic cell unit array 1201 and the electromagnetic panel 1402 comprises an electromagnetic cell unit array 1403. The electromagnetic panels together create an electromagnetic field 1404 that begins at electromagnetic panel 1400 and ends at the electromagnetic panel 1402. Further, the electromagnetic panels 1400 and 1402 are connected via a rotary 1300 that can include a rotor, an adjustor, a distributor, and electric flow for power distribution.

Figure 15:
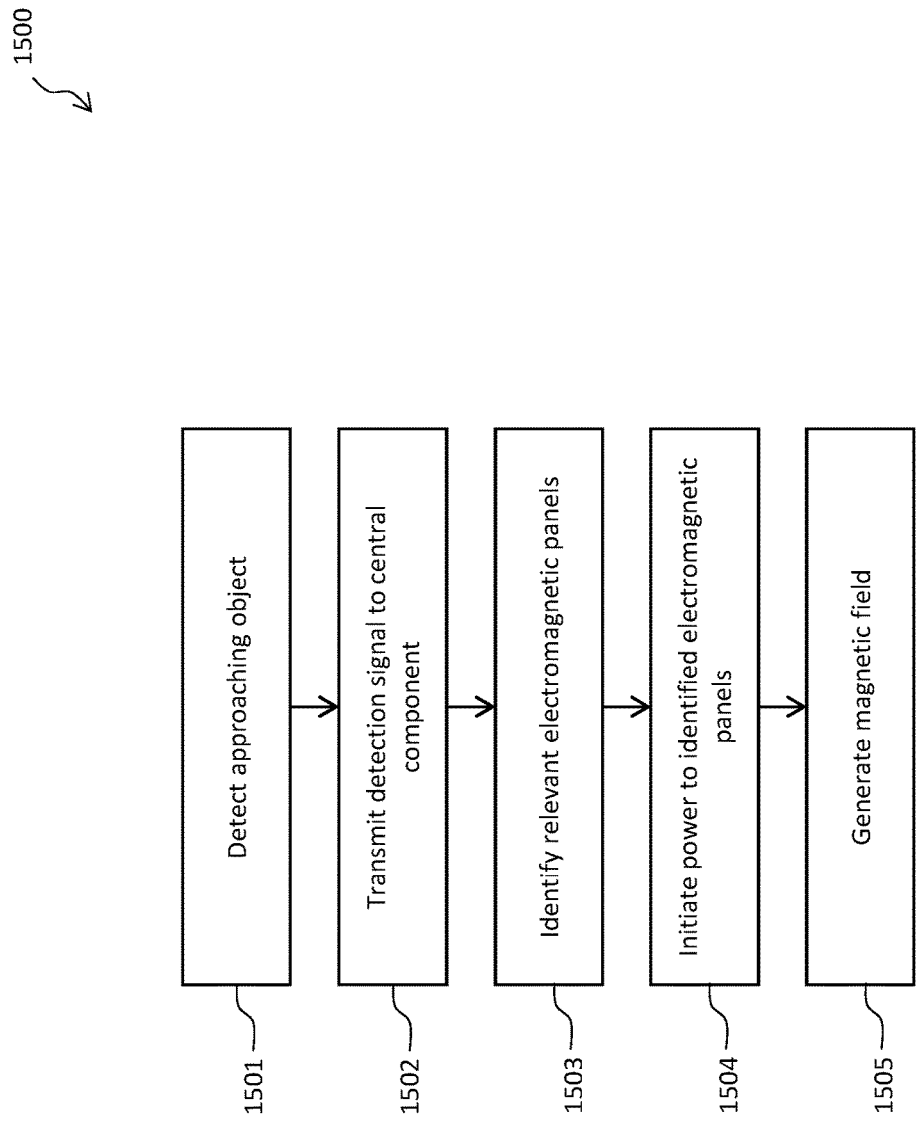
FIG. 15 is a process 1500 for guarding a ground vehicle via pulsive magnetic forces according to some embodiments of the present disclosure.

FIG. 15 is a process 1500 for guarding a ground vehicle via pulsive magnetic forces according to some embodiments of the present disclosure. At block 1501, one or more sensors detect an approaching object. In some embodiments, the one or more sensors can include one or more ultrasonic sensors or other sensors that can detect incoming objects. In some embodiments, detecting the approaching object can include determining that the object is approaching at a velocity greater than a predefined threshold. In some embodiments, the one or more sensors can be located at various points around the vehicle, such as the fender, bumper, passenger door, or side door. Moreover, the one or more sensors can be installed in conjunction with various electromagnetic panels 102.

At block 1502, in response to detecting an approaching object, the one or more sensors transmit a detection signal to the central component 103 that indicates the object is approaching the vehicle. In some embodiments, the detection signal can also include an identifier or other piece of data that identifies which sensor detected the object and which electromagnetic panels 102 are nearest to the approaching object. At block 1503, the central component 103 identifies the relevant electromagnetic panels 102 based on the data received from the one or more sensors. At block 1504, the central component 103 initiates power (i.e., electric current from a battery or other power source) to the identified electromagnetic panels 102. In some embodiments, the amount of power provided to the electromagnetic panel(s) 102 can be based on the degree of the incoming force of the approaching object. At block 1505, the electromagnetic panel(s) 102 that have received the power from the central component generates magnetic fields because the current is fed through the electromagnetic cell units 101.

When process 1500 is performed and the approaching object is another vehicle equipped with the disclosed guard impact ground vehicle system, then a repulsive force can be generated between the resulting magnetic fields, thereby minimizing/preventing the collision and impact of the two vehicles.

Figure 16:
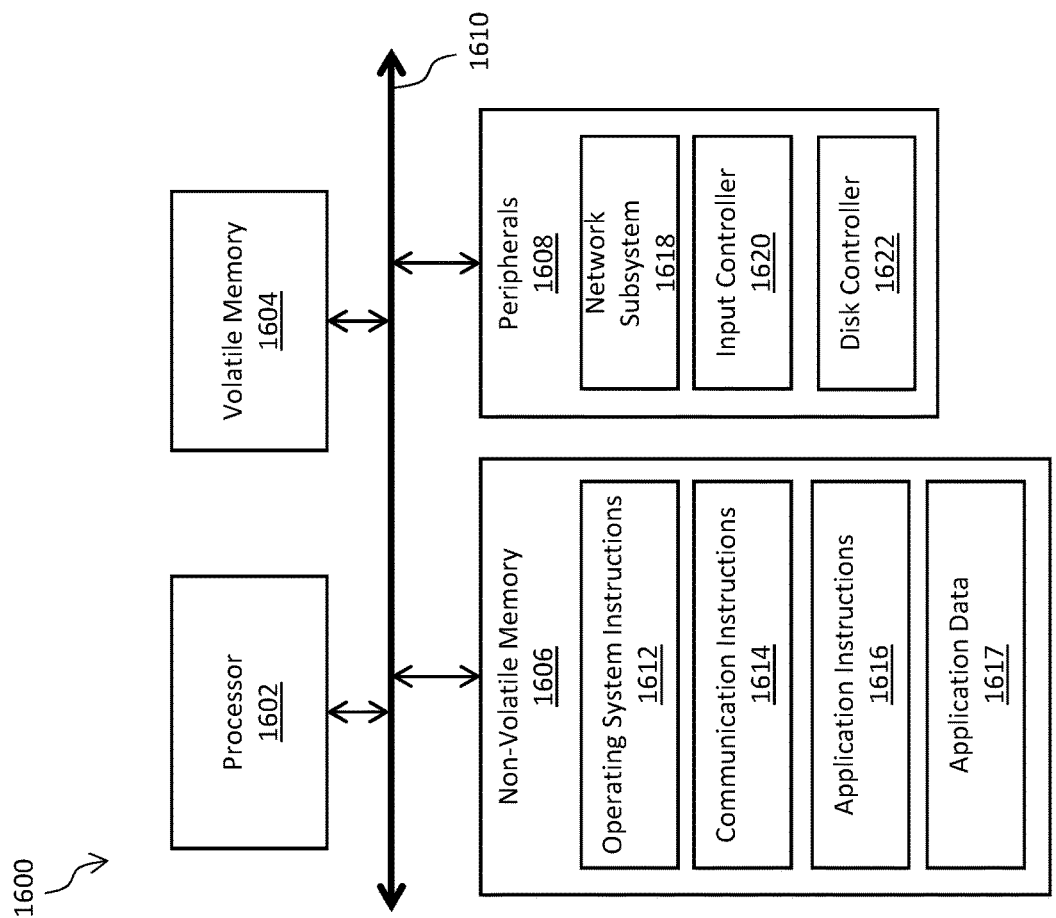
FIG. 16 is a diagram of an example processing device 1600 that can be used within the disclosed guard impact ground vehicle system.

FIG. 16 is a diagram of an example processing device 1600 that can be used within the disclosed guard impact ground vehicle system. For example, the processing device 1600 can be the central component 103. Processing device 1600 can implement various features and processes as described herein. Processing device 1600 can be implemented on any electronic device that runs software applications derived from complied instructions, including without limitation personal computers, servers, smart phones, media players, electronic tablets, game consoles, email devices, etc. In some implementations, processing device 1600 can include one or more processors 1602, volatile memory 1604, non-volatile memory 1606, and one or more peripherals 1608. These components can be interconnected by one or more computer buses 1610.

Processor(s) 1602 can use any known processor technology, including but not limited to graphics processors and multi-core processors. Suitable processors for the execution of a program of instructions can include, by way of example, both general and special purpose microprocessors, and the sole processor or one of multiple processors or cores, of any kind of computer. Bus 1610 can be any known internal or external bus technology, including but not limited to ISA, EISA, PCI, PCI Express, USB, Serial ATA, or FireWire. Volatile memory 1604 can include, for example, SDRAM. Processor 1602 can receive instructions and data from a read-only memory or a random access memory or both. Essential elements of a computer can include a processor for executing instructions and one or more memories for storing instructions and data.

Non-volatile memory 1606 can include by way of example semiconductor memory devices, such as EPROM, EEPROM, and flash memory devices; magnetic disks such as internal hard disks and removable disks; magneto-optical disks; and CD-ROM and DVD-ROM disks. Non-volatile memory 1606 can store various computer instructions including operating system instructions 1612, communication instructions 1614, application instructions 1616, and application data 1617. Operating system instructions 1612 can include instructions for implementing an operating system (e.g., Mac OS®, Windows®, or Linux). The operating system can be multi-user, multiprocessing, multitasking, multithreading, real-time, and the like. Communication instructions 1614 can include network communications instructions, for example, software for implementing communication protocols, such as TCP/IP, HTTP, Ethernet, telephony, etc. Application instructions 1616 can include instructions for various applications. Application data 1617 can include data corresponding to the applications.

Peripherals 1608 can be included within processing device 1600 or operatively coupled to communicate with processing device 1600. Peripherals 1608 can include, for example, network subsystem 1618, input controller 1620, and disk controller 1622. Network subsystem 1618 can include, for example, an Ethernet of WiFi adapter. Input controller 1620 can be any known input device technology, including but not limited to a keyboard (including a virtual keyboard), mouse, track ball, and touch-sensitive pad or display. Disk controller 1622 can include one or more mass storage devices for storing data files; such devices include magnetic disks, such as internal hard disks and removable disks; magneto-optical disks; and optical disks.

While various embodiments have been described above, it should be understood that they have been presented by way of example and not limitation. It will be apparent to persons skilled in the relevant art(s) that various changes in form and detail may be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" May often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

The invention claimed is:

1. A method for guarding a vehicle from an incoming collision comprising:
    detecting, via one or more sensors installed on a vehicle, an object approaching the vehicle;
    transmitting a detection signal to a central component installed at the vehicle;
    identifying one or more relevant electromagnetic panels of a plurality of electromagnetic panels installed on the vehicle;
    initiating electric power to the identified electromagnetic panels; and
    generating, via the one or more electromagnetic panels connected to a rotary component, a magnetic field comprising field lines external from the vehicle, wherein the magnetic field interacts with a second magnetic field associated with the approaching object to generate a repulsive force, wherein the rotary component comprises an adjustable transmission rod and a rotor configured to adjust the adjustable transmission rod.

2. The method of claim 1, wherein the object comprises a second vehicle.

3. The method of claim 2, wherein the second magnetic field is generated by:
    detecting, via one or more second sensors installed on the second vehicle, the vehicle approaching the second vehicle;
    transmitting a second detection signal to a second central component installed at the second vehicle;
    identifying one or more second relevant electromagnetic panels of a second plurality of electromagnetic panels installed on the second vehicle;
    initiating electric power to the second identified electromagnetic panels; and
    generating, via the one or more second electromagnetic panels, the second magnetic field.

4. The method of claim 1, wherein the one or more sensors comprise one or more ultrasonic sensors.

5. The method of claim 1, wherein the detection signal comprises an identifier of the one or more relevant electromagnetic panels.

6. The method of claim 1, wherein the one or more relevant electromagnetic panels are installed at one of a front fender, a back fender, a passenger door, a driver door, a back bumper, or a front bumper of the vehicle.

7. The method of claim 1, wherein the one or more relevant electromagnetic panels comprise a first electromagnetic panel and a second electromagnetic panel.

8. The method of claim 7, wherein the first and second electromagnetic panels each comprise a plurality of electromagnetic cell units.

9. The method of claim 8, wherein the plurality of electromagnetic cell units are arranged in an array.

10. The method of claim 7, wherein the first and second electromagnetic panels comprise a monopolar configuration.

11. The method of claim 10, wherein the magnetic field comprises magnetic field lines flowing from the first electromagnetic panel to the first electromagnetic panel and from the second electromagnetic panel to the second electromagnetic panel.

12. The method of claim 7, wherein the first and second electromagnetic panels comprise a bipolar configuration.

13. The method of claim 12, wherein the magnetic field comprises magnetic field lines flowing from the first electromagnetic panel to the second electromagnetic panel.

14. A system for guarding a vehicle from an incoming collision comprising:
- a plurality of electromagnetic panels installed on a vehicle, each electromagnetic panel being configured to, in response to receiving current, generate a magnetic field comprising field lines external from the vehicle, wherein the magnetic field interacts with a second magnetic field associated with an approaching object to generate a repulsive force, wherein each of the plurality of electromagnetic panels is connected to a rotary component and wherein the rotary component comprises an adjustable transmission rod and a rotor configured to adjust the adjustable transmission rod;
- a plurality of sensors installed on the vehicle, each sensor being associated with a respective electromagnetic panel, wherein each sensor is configured to detect the approaching object; and
- a central component configured to provide the current to at least one of the plurality of electromagnetic panels.

15. The system of claim 14, wherein, in response to detecting the approaching object, the respective sensor is configured to transmit a detection signal to the central component.

16. The system of claim 15, wherein, in response to receiving the detection signal, the central component is configured to:
- identify one or more relevant electromagnetic panels of a plurality of electromagnetic panels installed on the vehicle; and
- initiate the current to the identified electromagnetic panels.

17. The system of claim 14, wherein the plurality of electromagnetic panels are installed at least one of a front fender, a back fender, a passenger door, a driver door, a back bumper, or a front bumper of the vehicle.

18. The system of claim 16, wherein the one or more relevant electromagnetic panels comprise a first electromagnetic panel and a second electromagnetic panel.

19. The system of claim 18, wherein the first and second electromagnetic panels comprise a monopolar configuration.

20. The system of claim 18, wherein the first and second electromagnetic panels comprise a bipolar configuration.

* * * * *